Dec. 10, 1940.  W. R. MacKAY  2,224,441
AUTOMOBILE CONTROL DEVICE
Filed Nov. 28, 1939
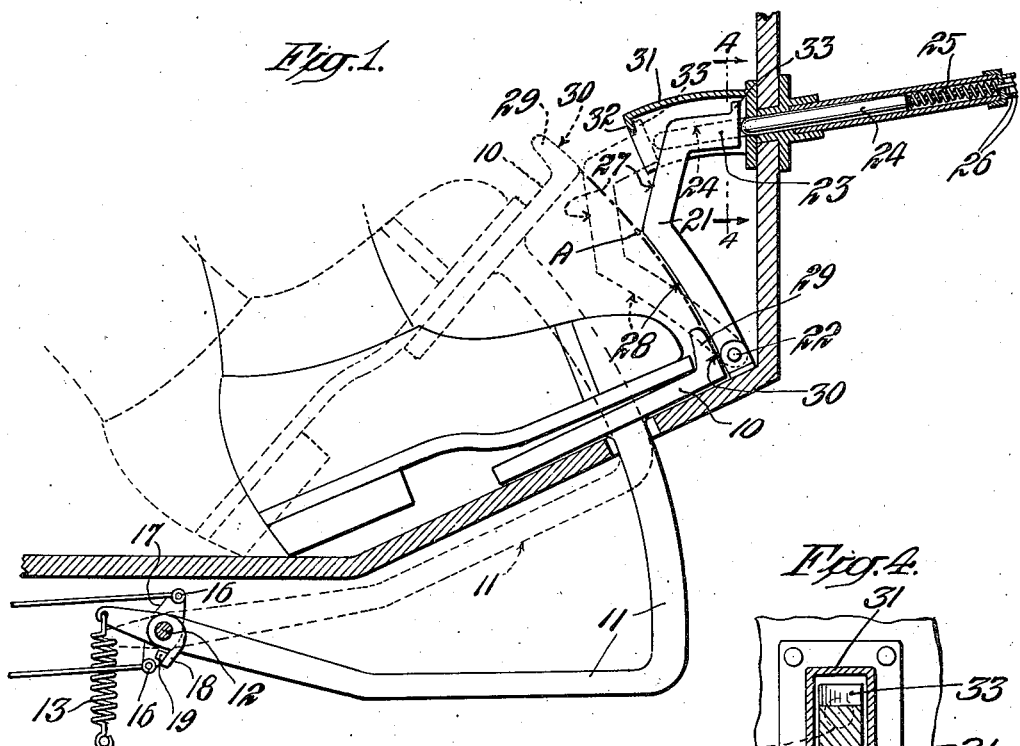
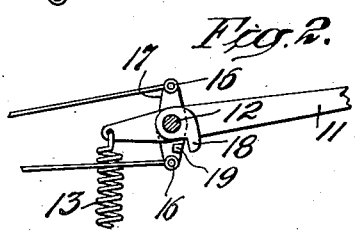
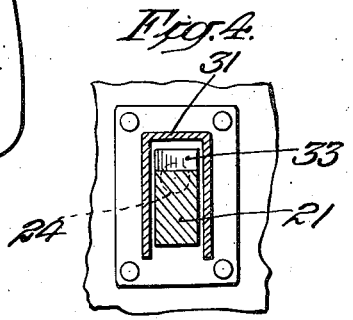
INVENTOR
William R. MacKay
BY
Robert W. Byerly
ATTORNEY Patented Dec. 10, 1940

2,224,441

UNITED STATES PATENT OFFICE 2,224,441

AUTOMOBILE CONTROL DEVICE

William R. MacKay, New York, N. Y.

Application November 28, 1939, Serial No. 306,458

2 Claims. (Cl. 192—3)

This invention relates to an automobile control device which utilizes instinctive natural movements and does away with a danger which has in the past caused many serious accidents.

Only partial provision is made in the conventional automobile controlling devices for the instinctive tightening of the muscles and stiffening of the limbs which occurs in the normal human being in the face of a sudden emergency. Such instinctive muscular action causes a driver to push down on the pedals which are under his feet at the time. If these happen to be the clutch and brake pedals the car is brought to a stop; but if, as is usually the case, the emergency occurs when one of the driver's feet is on the accelerator, the instinctive action gives the car a sudden forward movement which has led in the past to many accidents.

The device which I have invented provides a single foot pedal for controlling both the throttle and the brakes so that one foot may be kept on this pedal uninterruptedly during all conditions of driving. The device is so arranged that the first part of the downward movement of the combination pedal closes the throttle to idling position, while the second part of the downward movement maintains the throttle in idling position and applies the brakes. The speed of the car is under perfect control at all times, and safety results from the fact that the instinctive muscular tightening in the face of an emergency invariably brings the car to a stop.

A further advantage of my control device is that it gives an indication to the driver, by the racing of the engine, that the engine is running, so that the driver can turn the ignition switch to "off" position and stop the engine. The device is thus a deterrent to the parking of automobiles with their engines running. This is a source of danger which is forbidden by ordinances in most cities, but these ordinances are difficult to enforce, since it is not easy to detect whether or not the engine of a parked car is running. With my controlling device, removal of the foot from the combined control pedal opens the throttle and causes the engine to race so that the car cannot be parked with the engine running without making it evident to all those in the vicinity that the engine is running.

A still further advantage of my control device in its preferred form which I shall hereinafter describe in detail is its availability for use on present automobiles without discarding the parts used in the conventional control devices of such automobiles.

The accompanying drawing illustrates the preferred embodiment of my control device.

Fig. 1 is a side view of the device showing the floor and part of the dashboard of an automobile in section;

Fig. 2 is a detail showing the connection between the pedal lever and the brake rods;

Fig. 3 is a diagrammatic side view of an automobile chassis and engine showing the connections between my control device and the throttle valve and brakes; and Fig. 4 is an enlarged section on the line 4—4 of Fig. 1.

The pedal 10 shown in the drawing is mounted like the usual brake pedal on a bent arm 11 pivoted on a stud 12 on the chassis below the floor. A tension spring 13 is provided for urging the pedal into its raised position which is shown in dotted lines in Fig. 1 and in full lines in Fig. 3.

The pedal is connected with the brakes 14 of the automobile by means of the usual brake rods 15. The inner ends of the brake rods are secured to studs 16 on opposite ends of a bar 17 pivoted on the stud 12 on which the pedal arm 11 is pivoted. A projection 18 on the pedal arm 11 engages a projection 19 on the bar 17 when the pedal 10 is depressed below an intermediate point A in its arc of movement and turns the bar 17 to apply the brakes in the usual manner. When the pedal is above the point A, the projection 18 moves out of contact with the projection 19 (see Fig. 2) so that movements of the pedal above the point A have no effect on the brakes. The connection described is, however, unnecessary if the brakes be adjusted to release when the pedal moves up to the point A.

The pedal is connected to the throttle valve 20 of the car through a cam lever 21 which is located in front of the pedal. The cam lever 21 is pivoted at 22 at or below the floor of the car. The cam lever has at its upper end a forwardly extending arm 23 the end of which provides an abutment engaging a plunger 24. The plunger 24 is similar to the accelerator plunger ordinarily provided in the floor of a car under the accelerator pedal, but it is located in the dashboard instead of in the floor. It is provided with the usual spring 25 forcing it outwardly and is connected by the usual flexible wire and cable 26 to the throttle valve 20. Its connection with the throttle valve is, however, the reverse of the conventional arrangement, so that, when the plunger 24 is pushed out, the throttle valve is wide open, while when the plunger is forced fully inward the throttle valve is in idling position.

The rear edge of the cam lever 21 provides a two-part cam surface 27, 28 which is held in engagement with the forward edge of the pedal 10 by the spring 25. There is preferably an upturned flange 29 at the forward end of the pedal to provide a wide surface 30 for engaging the cam lever. This is, however, not essential as the cam lever may be operated by engagement with the front edge of an ordinary brake pedal. The upper cam surface 27 of the lever 21, which is located above the point A in the path of the pedal, is inclined to the arcuate path of the front edge of the pedal. The lower cam surface 28 of the lever 21, located below the point A, is parallel to the arcuate path of the front edge of the pedal. As the pedal is forced down from its upper position to the point A, its engagement with the cam surface 27 moves the lever 21 forward about its pivot so that the end of the arm 23 pushes in the plunger 24 and moves the throttle valve from open to idling position. As the pedal is depressed below the point A, so that, as stated above, it causes application of the brakes, the cam surface 28 is engaged by the pedal, holding the lever 21 stationary with its arm 23 forced against the plunger 24 so as to maintain the throttle valve in idling position. On upward movement of the pedal, the brakes are fully released before the lever 21 is allowed to move backwards so as to start to open the throttle valve. The friction of the cam surfaces against the edge of the pedal is not sufficient to prevent upward movement of the pedal under the force of the pedal spring 13 when foot pressure is removed from the pedal.

The plunger 24 and the lever arm 23 are most desirably protected by a housing 31 secured to the dashboard. Cooperating flanges 32, 33 may be provided on the housing and the arm to prevent backward turning of the lever 21 in case the pedal moves so far upward as to come out of engagement with the upper cam surface 27.

It is evident from the above description that my new control device may be constructed of the conventional control parts now used with the addition only of a simple and inexpensive cam lever such as the cam lever 21. My invention is, however, by no means limited to the preferred construction which has been described, as it is evident that other mechanical devices may be used to interconnect the pedal with the throttle valve and the brakes in such manner that the initial downward movement of the pedal closes the throttle while further downward movement keeps the throttle closed and applies the brakes, and that such other means are the equivalents of the particular devices shown in achieving the main purpose of my invention, which is to provide a controlling device in which the instinctive tightening of the driver's muscles in the face of an emergency invariably leads to stopping the automobile.

What I claim is:

1. The combination with an automobile having brakes, a brake pedal, a throttle valve and a plunger connected to the throttle valve, of a cam lever having an abutment engaging the plunger and a cam surface engaging the pedal and consisting of two parts, one of which is inclined to the direction of movement of the pedal and the other of which is parallel to the direction of movement of the pedal, so that the pedal moves the plunger when in engagement with the first part of the cam surface and holds the plunger stationary when in engagement with the second part of the cam surface.

2. The combination with an automobile having brakes, a brake pedal, a throttle valve and a plunger connected to the throttle valve, of a cam member directly connecting the plunger and the brake pedal and having a cam surface consisting of two parts, one of which is inclined to the direction of the movement of the pedal and the other of which is parallel to the direction of the movement of the pedal, so that the pedal moves the plunger when the first part of the cam surface is operative and holds the plunger stationary when the second part of the cam surface is operative.

WILLIAM R. MacKAY.